(12) United States Patent
Nazarpoor et al.

(10) Patent No.: US 9,610,570 B2
(45) Date of Patent: Apr. 4, 2017

(54) METHODS AND PROCESSES OF COATING ZERO-PGM CATALYSTS INCLUDING WITH CU, MN, FE FOR TWC APPLICATIONS

(71) Applicant: Clean Diesel Technologies, Inc., Oxnard, CA (US)

(72) Inventors: Zahra Nazarpoor, Camarillo, CA (US); Stephen J. Golden, Santa Barbara, CA (US)

(73) Assignee: Clean Diesel Technologies, Inc., Oxnard, CA (US)

(*) Notice: Subject to any disclaimer, the term of this patent is extended or adjusted under 35 U.S.C. 154(b) by 217 days.

(21) Appl. No.: 14/530,373

(22) Filed: Oct. 31, 2014

(65) Prior Publication Data

US 2015/0105247 A1    Apr. 16, 2015

Related U.S. Application Data

(63) Continuation-in-part of application No. 13/849,169, filed on Mar. 22, 2013, now Pat. No. 8,858,903.

(51) Int. Cl.

| | | |
|---|---|---|
| *B01J 23/889* | (2006.01) | |
| *B01J 23/847* | (2006.01) | |
| *B01J 21/04* | (2006.01) | |
| *B01J 21/06* | (2006.01) | |

(Continued)

(52) U.S. Cl.
CPC ........ *B01J 23/8892* (2013.01); *B01D 53/945* (2013.01); *B01D 2255/207* (2013.01); *B01D 2255/2073* (2013.01); *B01D 2255/20715* (2013.01); *B01D 2255/20761* (2013.01); *B01D 2255/405* (2013.01); *B01D 2255/65* (2013.01); *B01J 23/20* (2013.01); *B01J 2523/00* (2013.01); *Y02T 10/22* (2013.01); *Y10S 502/52712* (2013.01)

(58) Field of Classification Search
None
See application file for complete search history.

(56) References Cited

U.S. PATENT DOCUMENTS

| | | | | |
|---|---|---|---|---|
| 8,858,903 B2 * | 10/2014 | Nazarpoor | ........... | B01D 53/944 423/213.2 |
| 2003/0092566 A1 * | 5/2003 | Inoue | ................... | B01D 53/944 502/218 |
| 2010/0240525 A1 * | 9/2010 | Golden | ................ | B01D 53/945 502/65 |

* cited by examiner

*Primary Examiner* — Daniel Berns
(74) *Attorney, Agent, or Firm* — Alston & Bird LLP

(57) ABSTRACT

Variations of coating processes of Cu—Mn—Fe ZPGM catalyst materials for TWC applications are disclosed. The disclosed coating processes for Cu—Mn—Fe spinel materials are enabled in the preparation ZPGM catalyst samples according to a plurality of catalyst configurations, which may include an alumina only washcoat layer coated on a suitable ceramic substrate, and an overcoat layer with or without an impregnation layer, including Cu—Mn—Fe spinel and doped Zirconia support oxide, prepared according to variations of disclosed coating processes. Activity measurements are considered under variety of lean condition to rich condition to analyze the influence of disclosed coating processes on TWC performance of ZPGM catalysts for a plurality of TWC applications. Different coating processes may substantially increase thermal stability and TWC activity, providing improved levels of $NO_x$ conversion that may lead to cost effective manufacturing solutions for ZPGM-TWC systems.

13 Claims, 6 Drawing Sheets

(51) Int. Cl.
*B01D 53/94* (2006.01)
*B01J 23/20* (2006.01)

METHODS AND PROCESSES OF COATING ZERO-PGM CATALYSTS INCLUDING WITH CU, MN, FE FOR TWC APPLICATIONS

CROSS-REFERENCE TO RELATED APPLICATIONS

This application is a continuation-in-part of U.S. patent application Ser. No. 13/849,169, filed Mar. 23, 2013, entitled "Methods for Oxidation and Two-way and Three-way ZPGM Catalyst Systems and Apparatus Comprising Same," now U.S. Pat. No. 8,858,903, issued Oct. 14, 2014, which is incorporated herein by reference as if set forth in its entirety.

BACKGROUND

Field of the Disclosure

This disclosure relates generally to catalyst materials, and more particularly, to the influence of a plurality of coating processes, for catalyst materials including Cu—Mn—Fe ternary spinel systems on support oxides, upon performance of Zero-PGM catalysts for TWC applications.

Background Information

Catalyst attributes of activity, stability, selectivity, and regenerability in long-term service can be related to the physical and chemical properties of the catalyst materials, which in turn can be related to the method of preparation of the catalyst. The slurry characteristics of materials used are influential to the coating properties, which can be achieved by using different coating processes. A process for coating of sufficient loading may provide improved active sites for catalytic performance. As an ineffectual coating technique may result in heterogeneity of the applied coating, the preparation path for coatings may show critical factors which can influence the coating quality and catalytic performance.

Current ternary system-based catalysts for TWC applications are manufactured using platinum group metals (PGM) materials, such as platinum (Pt), palladium (Pd), and rhodium (Rh), among others, which may provide high catalytic activity. Recent environmental concerns for a catalyst's high performance have increased the focus on the operation of a TWC at the end of its lifetime. Catalytic materials used in TWC applications have also changed, and the new materials have to be thermally stable under the fluctuating exhaust gas conditions. As $NO_x$ emission standards tighten and PGMs become scarce with small market circulation volume, constant fluctuations in price, and constant risk to stable supply, there is an increasing need for new catalyst materials which may not require PGMs and may be able to maintain efficient TWC conversion of exhaust by-products.

According to the foregoing reasons, there may be a need to provide material compositions for PGM-free catalyst systems, which may be cost effectively manufactured, such that catalytic performance may be improved for a minimum loading, employing coating processes leading to the realization of suitable PGM-free catalytic layers in catalysts that can be used in a variety of environments and TWC applications.

SUMMARY

The present disclosure may provide Zero-PGM (ZPGM) catalysts, which may include stoichiometric or non-stoichiometric Cu—Mn—Fe spinel on a plurality of support oxides and their coating processes to determine the influence of coating processes on TWC performance.

According to embodiments in present disclosure, a ZPGM catalyst may include a substrate, a washcoat (WC) layer, an overcoat (OC) layer, and/or an impregnation (IMP) layer. A suitable synthesis method may be used for a plurality of coating processes to configure a ZPGM catalyst in which WC layer may be an alumina-based washcoat coated on suitable substrate. OC layer may include Cu—Mn—Fe spinel structure with general formulation $Cu_xMn_{1-x}Fe_2O_4$, where X may be variable of different molar ratios within a range of about $0.1<X<0.9$, in which X may preferably take a value of 0.5, and doped Zirconia support oxide, which may be subsequently coated on the alumina-based WC layer. In present disclosure, Niobium-Zirconia support oxide may be used in OC layer of ZPGM catalyst samples.

According to embodiments in present disclosure, fresh ZPGM catalyst samples may be configured with an alumina-based WC layer coated on suitable ceramic substrate. OC slurry may be made from powder of Cu—Mn—Fe supported on doped Zirconia, and subsequently coated on alumina-based WC layer; or OC layer of doped Zirconia support oxide for coating on alumina-based WC layer and an IMP layer including Cu—Mn—Fe spinel. In present disclosure the doped Zirconia support oxide may be Niobium-Zirconia support oxide.

In an embodiment, fresh ZPGM catalyst samples may be hydrothermally aged, employing steam/air or fuel flow at a plurality of temperatures.

Disclosed coating processes may be verified preparing fresh and aged samples for each of the catalyst formulations and configurations, objects of present disclosure, to determine the influence of the plurality of coating processes on TWC performance of ZPGM catalysts including disclosed ternary spinel systems.

The TWC standard light-off test may be performed for fresh ZPGM catalyst samples per coating processes employed in present disclosure. Standard light-off test may be performed under steady state condition, at a selected R-value for catalytic activity in $NO_x$, CO, and HC conversions. Comparison of catalytic activity may be developed for fresh ZPGM catalyst samples, as may be shown by $T_{50}$ values resulting when the influence on TWC activity is measured/analyzed for different coating processes.

The NO/CO cross over R-value of fresh and aged ZPGM catalyst samples, per coating processes employed in present disclosure, may be determined and compared by performing isothermal steady state sweep test. The isothermal steady state sweep test may be performed at a selected inlet temperature using an 11-point R-value from rich condition to lean condition at a plurality of space velocities. Results from isothermal steady state sweep test may be compared to show the influence that a coating process may have on TWC performance of ZPGM catalysts.

The TWC property that may result from the plurality of coating processes may indicate that for catalyst applications, and more particularly, for ZPGM catalysts, the chemical composition of the catalyst may be more efficient operationally-wise, and from a catalyst manufacturer's viewpoint, an essential advantage given the economic factors involved when substantially PGM-free materials may be used to manufacture ZPGM catalysts for a plurality of TWC applications.

Numerous other aspects, features, and benefits of the present disclosure may be made apparent from the following detailed description taken together with the drawing figures, which may illustrate the embodiments of the present disclosure, incorporated herein for reference.

BRIEF DESCRIPTION OF THE DRAWINGS

The present disclosure can be better understood by referring to the following figures. The components in the figures are not necessarily to scale, emphasis instead being place upon illustrating the principles of the disclosure. In the figures, reference numerals designate corresponding parts throughout the different views.

DETAILED DESCRIPTION

Figure 1:
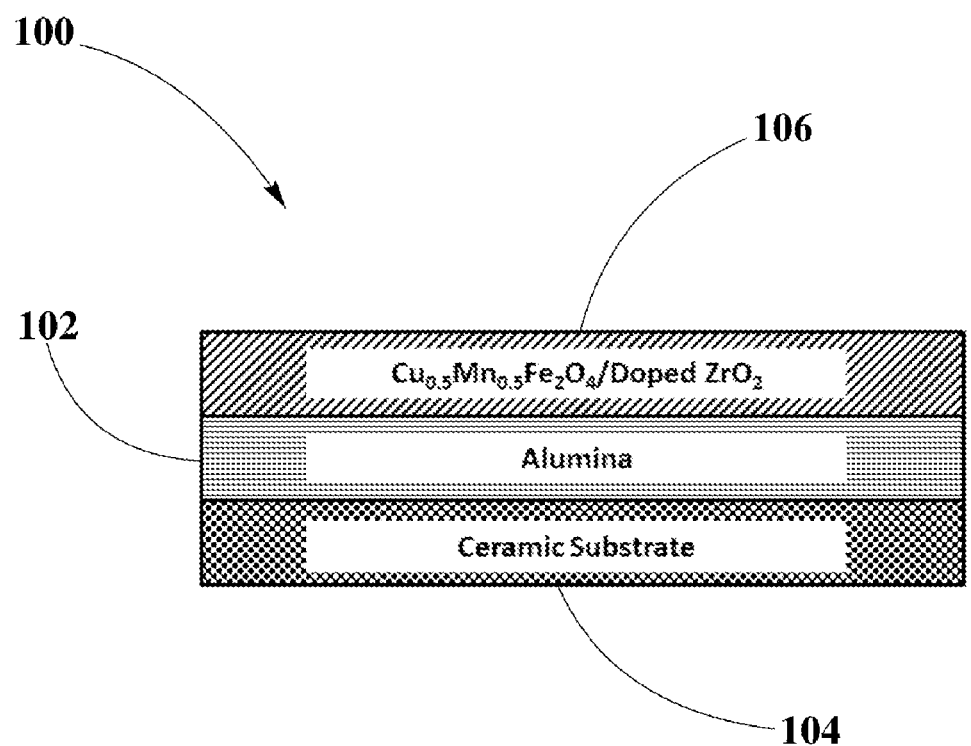
FIG. 1 shows a catalyst configuration for fresh and aged ZPGM catalyst samples prepared using coating process referred as coating process Type 1, according to an embodiment.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

DEFINITIONS

As used here, the following terms may have the following definitions:

"Platinum group Metal (PGM)" refers to platinum, palladium, ruthenium, iridium, osmium, and rhodium.

"Zero platinum group (ZPGM) catalyst" refers to a catalyst completely or substantially free of platinum group metals.

"Catalyst" refers to one or more materials that may be of use in the conversion of one or more other materials.

"Substrate" refers to any material of any shape or configuration that yields a sufficient surface area for depositing a washcoat and/or overcoat.

"Washcoat" refers to at least one coating including at least one oxide solid that may be deposited on a substrate.

"Overcoat" refers to at least one coating that may be deposited on at least one washcoat or impregnation layer.

"Milling" refers to the operation of breaking a solid material into a desired grain or particle size.

"Impregnation" refers to the process of imbuing or saturating a solid layer with a liquid compound or the diffusion of some element through a medium or substance.

"Calcination" refers to a thermal treatment process applied to solid materials, in presence of air, to bring about a thermal decomposition, phase transition, or removal of a volatile fraction at temperatures below the melting point of the solid materials.

"Treating, treated, or treatment" refers to drying, firing, heating, evaporating, calcining, or mixtures thereof.

"Spinel" refers to any of various mineral oxides of magnesium, iron, zinc, or manganese in combination with aluminum, chromium, copper or iron with $AB_2O_4$ structure.

"Conversion" refers to the chemical alteration of at least one material into one or more other materials.

"R-value" refers to the number obtained by dividing the reducing potential by the oxidizing potential of materials in a catalyst.

"Rich condition" refers to exhaust gas condition with an R-value above 1.

"Lean condition" refers to exhaust gas condition with an R-value below 1.

"Three-way catalyst (TWC)" refers to a catalyst that may achieve three simultaneous tasks: reduce nitrogen oxides to nitrogen and oxygen, oxidize carbon monoxide to carbon dioxide, and oxidize unburnt hydrocarbons to carbon dioxide and water.

"$T_{50}$" refers to the temperature at which 50% of a material is converted.

Description of the Drawings

The present disclosure may provide material compositions including Cu—Mn—Fe spinel on support oxide, coating process, and their influence on TWC performance to develop suitable catalytic layers, which may ensure the identification of a coating process, capable of providing high chemical reactivity, and thermal and mechanically stability for ZPGM catalysts. Aspects that may be treated in present disclosure may show improvements in the process for overall catalytic conversion capacity for a plurality of ZPGM catalysts, which may be suitable for TWC applications.

ZPGM Catalyst Configuration, Material Composition, and Preparation

As catalyst performance parameters may be translated into the physical catalyst structure, different coating methods may be used to achieve desired coating properties and an effective level of catalytic performance. A plurality of synthesis method may be used in present disclosure.

FIG. 1 shows catalyst configuration 100 which may be used for coating of Cu—Mn—Fe spinel as powder to prepare ZPGM catalyst samples. In present disclosure, Cu—Mn—Fe spinel structure may be prepared using the general formulation $Cu_xMn_{1-x}Fe_2O_4$, where X may be variable of different molar ratios within a range of about 0.1<X<0.9, in which X may preferably have a value of 0.5. Accordingly, in this configuration, washcoat (WC) layer 102 may be alumina only, coated on suitable ceramic substrate 104. Overcoat (OC) layer 106 may include $Cu_{0.5}Mn_{0.5}Fe_2O_4$ spinel bulk powder which may be prepared separately and subsequently added to milled doped Zirconia support oxide for coating on alumina-based WC layer 102. In present disclosure, Niobium-Zirconia support oxide may be used as support oxide in catalyst configuration 100.

Figure 2:
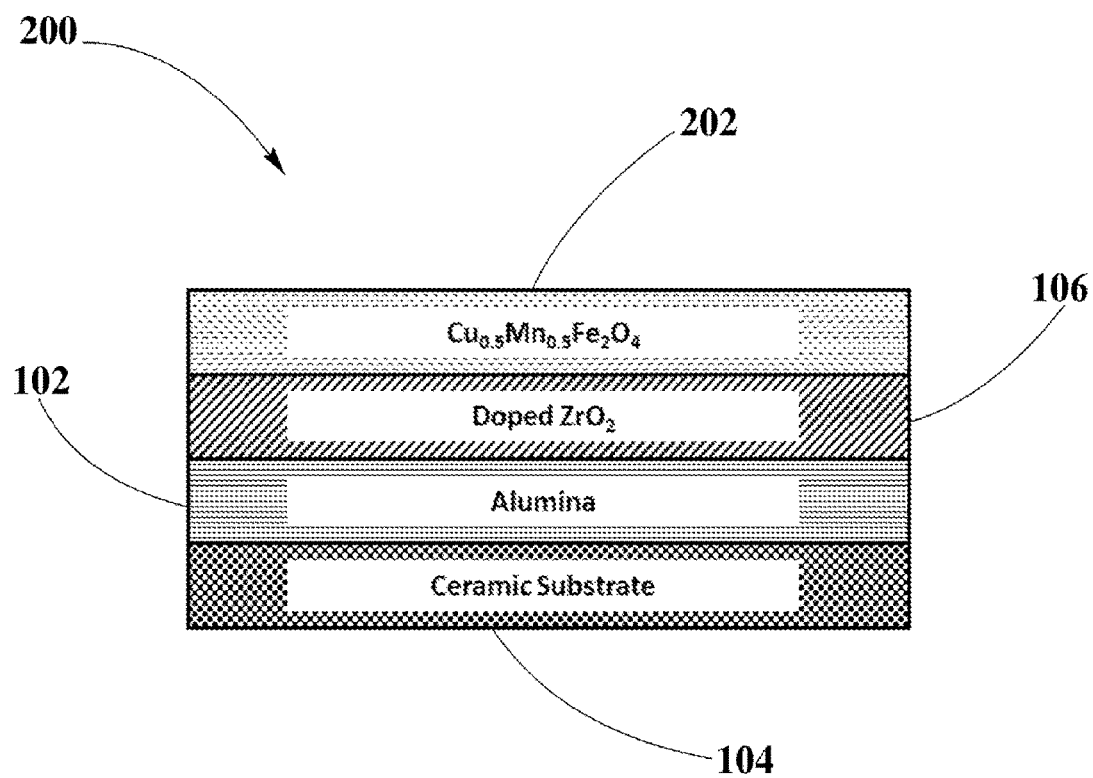
FIG. 2 illustrates a catalyst configuration for fresh and aged ZPGM catalyst samples prepared using coating process referred as coating process Type 2, according to an embodiment.

FIG. 2 depicts catalyst configuration 200 which may be employed for impregnation of Cu—Mn—Fe spinel on doped Zirconia support oxide to prepare ZPGM catalyst samples. In present disclosure, Cu—Mn—Fe impregnation solution may be prepared using the general formulation $Cu_xMn_{1-x}Fe_2O_4$, where X may be variable of different molar ratios within a range of about 0.1<X<0.9, in which X may preferably have a value of 0.5. In this configuration, WC layer 102 may be alumina only, coated on suitable ceramic substrate 104. Impregnation (IMP) layer 202 including $Cu_{0.5}Mn_{0.5}Fe_2O_4$ spinel may be added to OC layer 106 of doped Zirconia support oxide. In present disclosure, Niobium-Zirconia support oxide may be used as support oxide in catalyst configuration 200.

Fresh ZPGM catalyst samples may be hydrothermally aged, employing about 10% steam/air or fuel flow at a plurality of temperatures within a range from about 800° C. to about 1,000° C. for a plurality of aging times.

Standard light-off test may be performed for ZPGM catalyst samples, per disclosed coating processes, under steady state condition at a selected R-value as verification for the influence of coating processes on TWC activity.

The NO/CO cross over R-value of ZPGM catalyst samples, per disclosed coating processes, may be determined and analyzed by performing isothermal steady state sweep test.

TWC Standard Light-Off Test Procedure

TWC standard light-off test under steady state condition may be performed employing a flow reactor in which temperature may be increased from about 100° C. to about 500° C. at a rate of about 40° C./min, feeding a standard TWC gas composition of about 8,000 ppm of CO, about 400 ppm of $C_3H_6$, about 100 ppm of $C_3H_8$, about 1,000 ppm of $NO_x$, about 2,000 ppm of $H_2$, about 10% of $CO_2$, about 10% of $H_2O$, and about 0.70% of $O_2$. The average R-value is about 1.2, at space velocity (SV) of about 40,000 $h^{-1}$.

Isothermal Steady State Sweep Test Procedure

The isothermal steady state sweep test may be done employing a flow reactor at inlet temperature of about 450° C., and testing a gas stream at 11-point R-values from about 2.00 (rich condition) to about 0.80 (lean condition) to measure the CO, $NO_x$, and HC conversions.

The SV in the isothermal steady state sweep test may be adjusted at about 40,000 $h^{-1}$. The gas feed employed for the test may be a standard TWC gas composition, with variable $O_2$ concentration in order to adjust R-value from rich condition to lean condition during testing. The standard TWC gas composition may include about 8,000 ppm of CO, about 400 ppm of $C_3H_6$, about 100 ppm of $C_3H_8$, about 1,000 ppm of $NO_x$, about 2,000 ppm of $H_2$, about 10% of $CO_2$, and about 10% of $H_2O$. The quantity of $O_2$ in the gas mix may be varied to adjust Air/Fuel (A/F) ratio within the range of R-values to test the gas stream.

The following examples are intended to illustrate the scope of the disclosure. It is to be understood that other procedures known to those skilled in the art may alternatively be used.

EXAMPLES

Example #1

Coating Process Type 1, Cu—Mn—Fe Spinel Bulk Powder/$Nb_2O_5$—$ZrO_2$ Support Oxide Example #1 may illustrate preparation of fresh and aged ZPGM catalyst samples of catalyst configuration 100 employing coating process here referred as coating process Type 1. Aged catalyst samples may be prepared by hydrothermal aging employing about 10% steam/air at a plurality of temperatures within a range from about 800° C. to about 1,000° C. for about 4 hours. In this embodiment, hydrothermally aged samples may be preferably aged at 900° C. for about 4 hours.

Preparation of WC layer 102 may start by milling alumina to make slurry. Suitable loading of alumina may be about 120 g/L. Alumina slurry may be subsequently coated on ceramic substrate 104 and fired at about 550° C. for about 4 hours. Preparation of OC layer 106 may start by milling $Nb_2O_5$—$ZrO_2$ support oxide with water separately to make slurry. Then, Cu—Mn—Fe solution may be prepared by mixing the appropriate amount of Cu nitrate solution ($CuNO_3$), Mn nitrate solution ($Mn(NO_3)_2$), and Fe nitrate solution ($Fe(NO_3)_3$) with water to make solution at appropriate molar ratio for $Cu_{0.5}Mn_{0.5}Fe_2O_4$, according to formulation $Cu_xMn_{1-x}Fe_2O_4$, in which X may take value of 0.5. Subsequently, Cu—Mn—Fe solution may be precipitated using an appropriate amount of base solution to adjust pH of slurry at desired level. Then, slurry may undergo filtering and washing with distilled water, followed by drying, and subsequently, calcination at selected temperature of about 600° C. for about 5 hours to prepare fine grain powder of $Cu_{0.5}Mn_{0.5}Fe_2O_4$. Cu—Mn—Fe spinel powder may then be mixed with slurry of $Nb_2O_5$—$ZrO_2$ support oxide. Suitable loading of OC layer 106 may be about 120 g/L. Then, slurry of Cu—Mn—Fe solution and $Nb_2O_5$—$ZrO_2$ support oxide may be coated on top of WC layer 102 and fired at about 600° C. for about 5 hours. Subsequently, fresh ZPGM catalyst samples may be hydrothermally aged, according to an embodiment.

TWC standard light-off test under steady state condition may be performed for fresh and aged ZPGM catalyst samples, per disclosed coating process Type 1, at average R-value of about 1.2, at SV of about 40,000 $h^{-1}$, at rate of about 40° C./min for temperature increase, and testing a TWC gas stream to verify the influence of coating process on TWC activity. In present disclosure, standard light-off test may be performed for fresh ZPGM catalyst samples.

The NO/CO cross over R-value of fresh and aged ZPGM catalyst samples, per disclosed coating process Type 1, may be determined by performing isothermal steady state sweep test at inlet temperature of about 450° C., and testing a gas stream at 11-point R-values from about 2.0 (rich condition) to about 0.8 (lean condition) to measure the CO, $NO_x$, and HC conversions. SV in the isothermal steady state sweep test may be adjusted at about 40,000 $h^{-1}$.

Example #2

Coating Process Type 2, IMP of Cu—Mn—Fe Spinel on $Nb_2O_5$—$ZrO_2$ Support Oxide Example #2 may illustrate preparation of fresh and aged ZPGM catalyst samples of catalyst configuration 200 employing coating process here referred as coating process Type 2. Aged catalyst samples may be prepared by hydrothermal aging employing about 10% steam/air at a plurality of temperatures within a range from about 800° C. to about 1,000° C. for about 4 hours. In this embodiment, hydrothermally aged samples may be preferably aged at 900° C. for about 4 hours.

Preparation of WC layer 102 may start by milling alumina to make slurry. Suitable loading of alumina may be about 120 g/L. Alumina slurry may be subsequently coated on ceramic substrate 104 and fired at about 550° C. for about 4 hours. Preparation of OC layer 106 may start by milling $Nb_2O_5$—$ZrO_2$ support oxide with water separately to make slurry. Slurry of $Nb_2O_5$—$ZrO_2$ support oxide may then be coated on WC layer 102 and fired at about 550° C. for about 4 hours. Suitable loading for OC layer 106 may be about 120 g/L. Subsequently, an IMP layer 202 of Cu—Mn—Fe spinel may be prepared. Accordingly, Cu—Mn—Fe solution may be prepared by mixing the appropriate amount of Cu nitrate solution ($CuNO_3$), Mn nitrate solution ($Mn(NO_3)_2$), and Fe nitrate solution ($Fe(NO_3)_3$) with water to make solution at appropriate molar ratio for $Cu_{0.5}Mn_{0.5}Fe_2O_4$, according to formulation $Cu_xMn_{1-x}Fe_2O_4$, in which X may take value of about 0.5. Then, $Cu_{0.5}Mn_{0.5}Fe_2O_4$ spinel solution may be impregnated on OC layer 106 of $Nb_2O_5$—$ZrO_2$ support oxide and fired at about 600° C. for about 5 hours. Subsequently, fresh ZPGM catalyst samples may be hydrothermally aged, according to an embodiment.

TWC standard light-off test under steady state condition may be performed for fresh and aged ZPGM catalyst samples, per disclosed coating process Type 2, at average R-value of about 1.2, at SV of about 40,000 $h^{-1}$, at rate of about 40° C./min for temperature increase, and testing a TWC gas stream to verify the influence of coating process on TWC activity. In present disclosure, standard light-off test may be performed for fresh ZPGM catalyst samples.

The NO/CO cross over R-value of fresh and aged ZPGM catalyst samples, per disclosed coating process Type 2, may be determined by performing isothermal steady state sweep test at inlet temperature of about 450° C., and testing a gas stream at 11-point R-values from about 2.0 (rich condition) to about 0.8 (lean condition) to measure the CO, $NO_x$, and HC conversions. SV in the isothermal steady state sweep test may be adjusted at about 40,000 $h^{-1}$.

Analysis of Influence of Variations of Coating Processes on TWC Performance

The improvements in $NO_x$, CO, and HC conversions when applying different coating processes may be confirmed with the results from standard light-off test for fresh ZPGM catalyst samples prepared per example #1 and example #2.

For fresh ZPGM catalyst samples prepared using coating process Type 1, per example #1, $NO_x$ $T_{50}$ occurs at about 494° C., CO $T_{50}$ takes place at about 309° C., and HC $T_{50}$ occurs at about 476°0 C. For fresh ZPGM catalyst samples prepared using coating process Type 2, per example #2, $NO_x$ $T_{50}$ occurs at about 439° C., CO $T_{50}$ takes place at about 283° C., and HC $T_{50}$ occurs at about 415° C.

A comparison of results of $NO_x$, CO, and HC $T_{50}$ indicates and verifies that fresh ZPGM catalyst samples per example #2 are more effective than fresh ZPGM catalyst samples per example #1since they exhibit lower temperatures $T_{50}$ for all TWC conversion. This improvement is more significant for $NO_x$ and HC conversions. Impregnation of Cu—Mn—Fe reduces $NO_x$ and HC $T_{50}$ about 55° C. and about 61° C., respectively.

Figure 3:
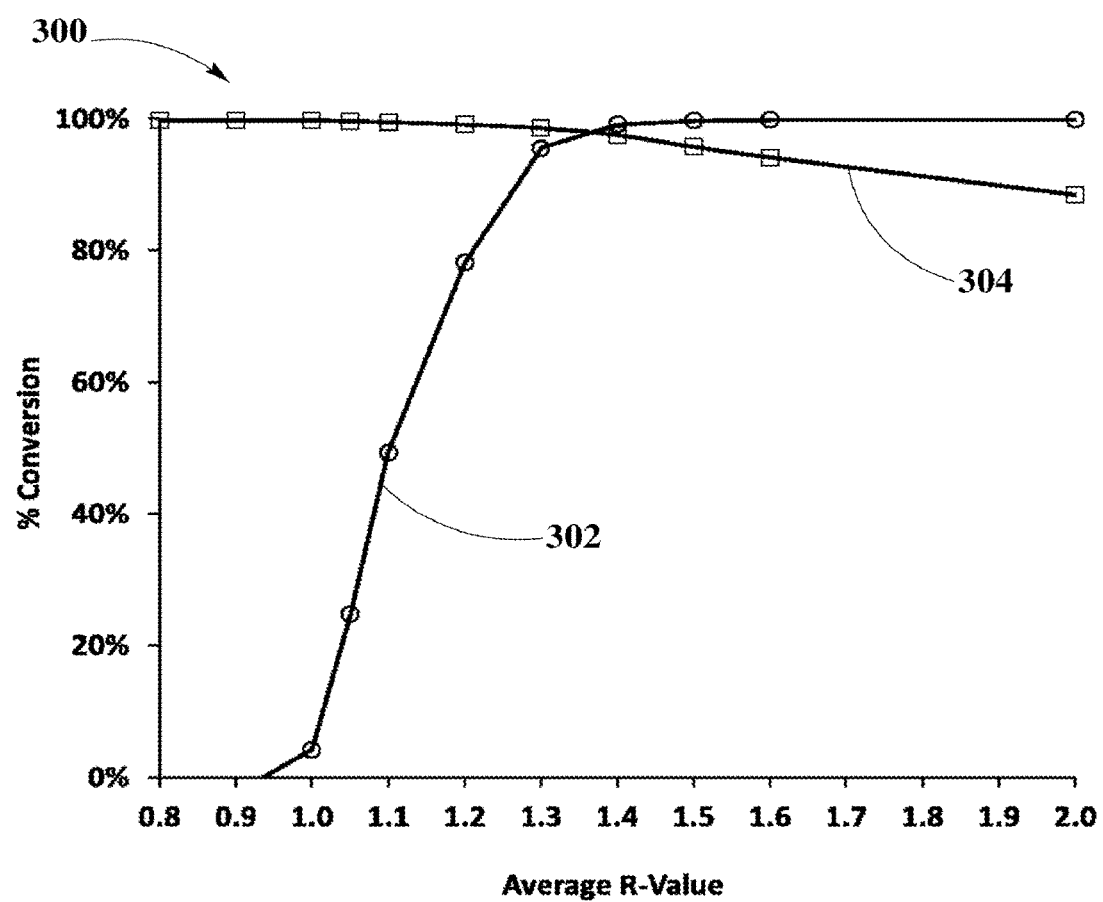
FIG. 3 depicts catalyst performance for fresh ZPGM catalyst samples prepared using coating process Type 1, under isothermal steady state sweep condition, at inlet temperature of about 450° C. and space velocity (SV) of about 40,000 $h^{-1}$, according to an embodiment.

FIG. 3 shows catalyst performance 300 for fresh ZPGM catalyst samples prepared using coating process Type 1, per example #1, under isothermal steady state sweep condition, at inlet temperature of about 450° C. and SV of about 40,000 $h^{-1}$, according to an embodiment.

In FIG. 3, conversion curve 302 (solid line with circle) and conversion curve 304 (solid line with square) respectively show isothermal steady state sweep test results for $NO_x$ conversion and CO conversion.

As may be seen in FIG. 3, for fresh ZPGM catalyst samples, NO/CO cross over R-value takes place at the specific R-value of 1.37, where $NO_x$ and CO conversions are about 98.00%, respectively.

Activity at about stoichiometric condition for fresh ZPGM catalyst samples, per coating process Type 1, may be observed at R-values of 1.05. At R-value of 1.05, $NO_x$ conversion is about 24.80%, and CO conversion is about 99.70%. At R-value of 1.10, $NO_x$ and CO conversions are about 49.40% and about 99.50%, respectively.

Figure 4:
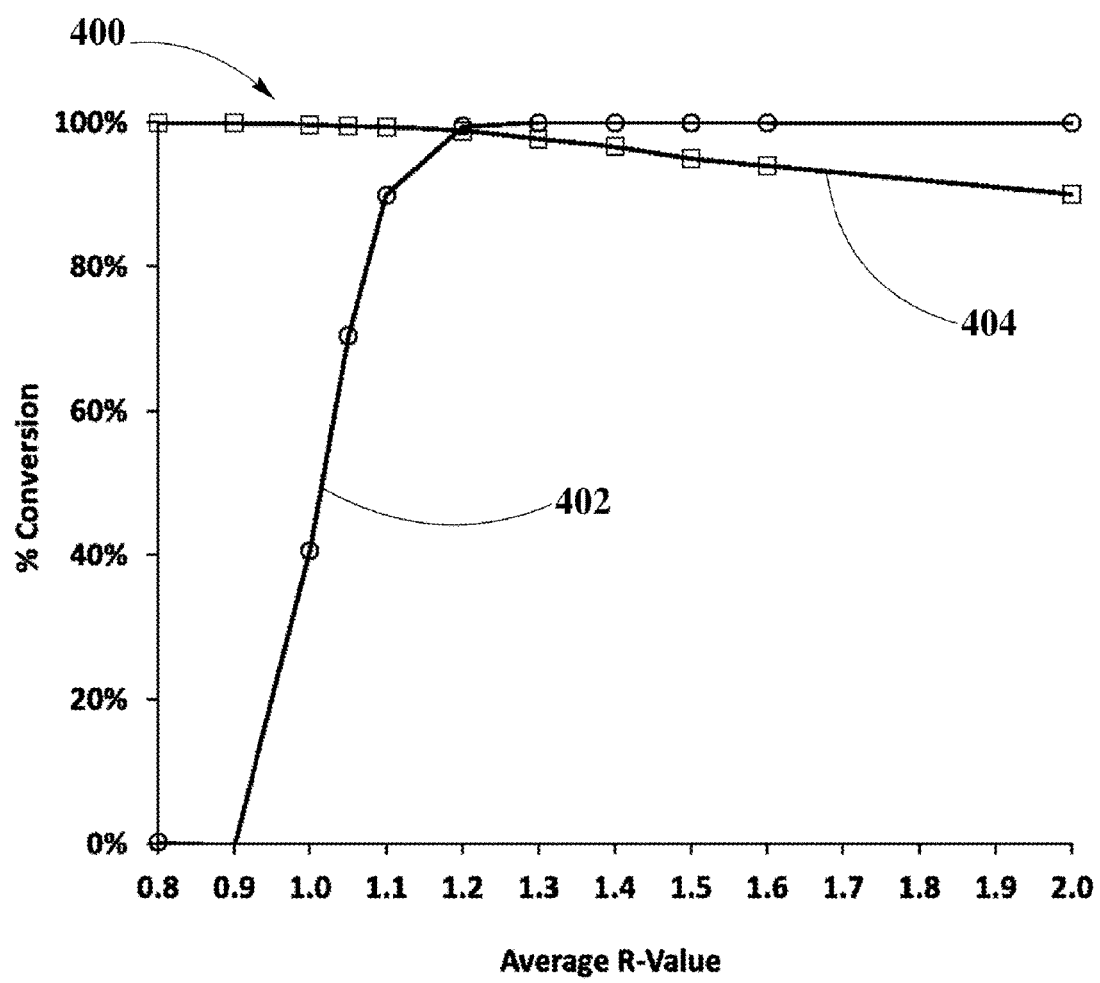
FIG. 4 shows catalyst performance for fresh ZPGM catalyst samples prepared using coating process Type 2, under isothermal steady state sweep condition, at inlet temperature of about 450° C. and SV of about 40,000 $h^{-1}$, according to an embodiment.

FIG. 4 depicts catalyst performance 400 for fresh ZPGM catalyst samples prepared using coating process Type 2, per example #2, under isothermal steady state sweep condition, at inlet temperature of about 450° C. and SV of about 40,000 $h^{-1}$, according to an embodiment.

In FIG. 4, conversion curve 402 (solid line with circle) and conversion curve 404 (solid line with square) respectively depict isothermal steady state sweep test results for $NO_x$ conversion and CO conversion.

As may be seen in FIG. 4, for fresh ZPGM catalyst samples, NO/CO cross over R-value takes place at the specific R-value of 1.19, where $NO_x$ and CO conversions are about 98.80%, respectively.

Activity at about stoichiometric condition for fresh ZPGM catalyst samples, per coating process Type 2, may be observed at R-values of 1.05. At R-value of 1.05, $NO_x$ conversion is about 70.40%, and CO conversion is about 99.50%. At R-value of 1.10, $NO_x$ and CO conversions are about 89.90% and about 99.30%, respectively.

It may also observed from FIG. 3 and FIG. 4 that fresh ZPGM catalyst samples, per example #2, show significant improvement of $NO_x$ conversion, under all region of R-value from lean to stoichiometric and to rich conditions, when compare with $NO_x$ of fresh ZPGM catalyst samples, per example #1. At R-value of 1.05, about 24.80% $NO_x$ conversion levels may be noted for fresh ZPGM catalyst samples, per example #1, while about 70.40% $NO_x$ conversion levels may be noted for fresh ZPGM catalyst samples, per example #2. Results from FIG. 3 and FIG. 4 verify the influence that variations of coating processes may have on TWC performance, showing that fresh ZPGM catalyst samples including IMP layer 202 of $Cu_{0.5}Mn_{0.5}Fe_2O_4$ provide significant improvement on TWC performance, especially $NO_x$ conversion.

Figure 5:
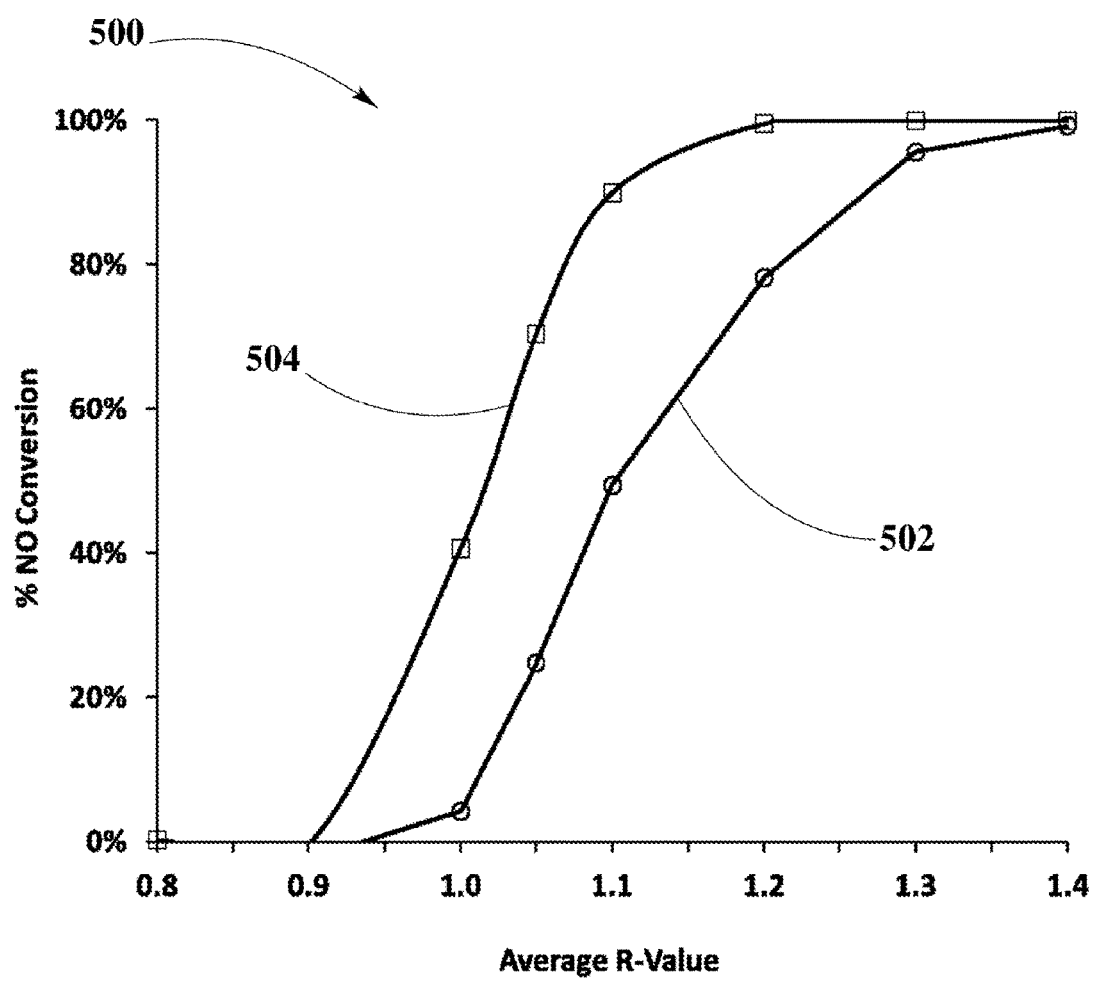
FIG. 5 illustrates $NO_x$ conversion comparison for fresh ZPGM catalyst samples prepared using coating processes Type 1 and Type 2, according to an embodiment.

FIG. 5 illustrates $NO_x$ conversion comparison 500 for fresh ZPGM catalyst samples prepared using coating processes Type 1 and Type 2, under isothermal steady state sweep condition, at inlet temperature of about 450° C. and SV of about 40,000 h–1, according to an embodiment.

In FIG. 5, conversion curve 502 (solid line with circle), and conversion curve 504 (solid line with square) respectively illustrate $NO_x$ conversion results for coating processes Type 1, per example #1, and Type 2, per example #2.

As may be seen in FIG. 5, for fresh ZPGM catalyst samples, coating process with IMP layer, Type 2, exhibits higher level of influence on activity in $NO_x$ conversion than coating process with OC layer of ZPGM, Type 1. At R-value of 1.10 (rich condition close to stoichiometric condition), $NO_x$ conversions for coating process Type 1 and coating process Type 2 are about 49.40% and about 89.90%, respectively. It may be noted that coating process Type 2 shows activity improvement compared with coating process Type 1. Comparison of $NO_x$ conversions may indicate that the observed difference in $NO_x$ conversion for fresh ZPGM catalyst samples prepared using coating process Type 1 and Type 2 may be related to the level of dispersion of Cu—Mn—Fe spinel on support oxide.

Figure 6:
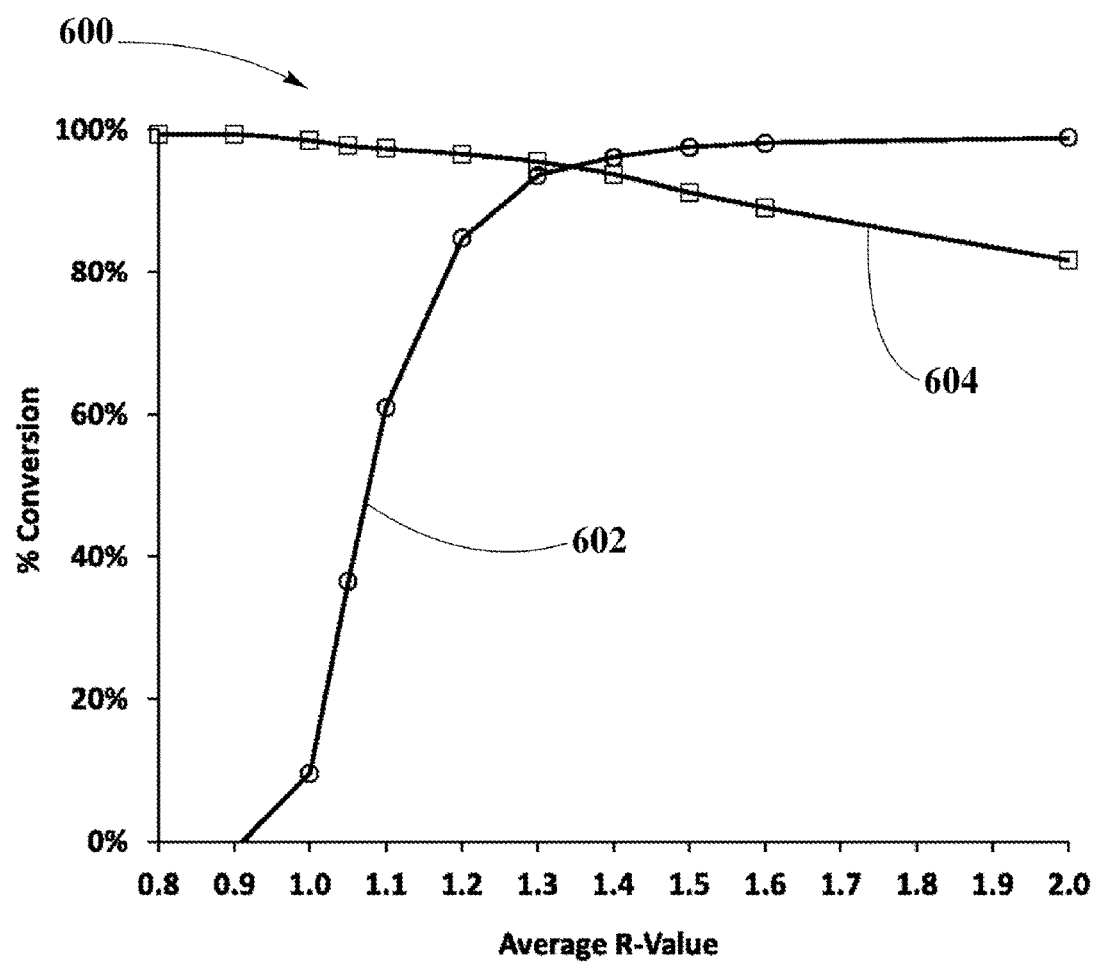
FIG. 6 depicts catalyst performance for hydrothermally aged ZPGM catalyst samples prepared using coating process Type 2, under isothermal steady state sweep condition, at inlet temperature of about 450° C. and SV of about 40,000 $h^{-1}$, according to an embodiment.

FIG. 6 shows catalyst performance 600 for hydrothermally aged ZPGM catalyst samples prepared using coating process Type 2, per example #2, under isothermal steady state sweep condition, at inlet temperature of about 450° C. and SV of about 40,000 h$^{-1}$, according to an embodiment.

In FIG. 6, conversion curve 602 (solid line with circle) and conversion curve 604 (solid line with square) respectively depict isothermal steady state sweep test results for NO$_x$ conversion and CO conversion.

As may be seen in FIG. 6, for hydrothermally aged ZPGM catalyst samples, NO/CO cross over R-value takes place at the specific R-value of 1.34, where NO$_x$ and CO conversions are about 94.60%, respectively.

Activity at about R-value of 1.20 for hydrothermally aged ZPGM catalyst samples, per coating process Type 2, may be observed for NO$_x$ conversion of about 84.40% and for CO conversion of about 96.60%, which indicates catalyst is still active after aging ZPGM catalyst samples, although the activity decreased compared with fresh ZPGM catalyst samples of Type 2, per example #2.

Hydrothermally aged ZPGM catalyst samples prepared using coating process Type 1, per example #1, do not show a NO/CO cross over R-value. As may be noted, deactivation in hydrothermally aged ZPGM catalyst samples, per example #2, is not significant as in hydrothermally aged ZPGM catalyst samples, per example #1, indicating better thermal stability of ZPGM sample of Type 2, per example #2.

According to principles in present disclosure, use of different coating processes may bring about different influence on TWC performance, as may be observed from the results of the disclosed coating processes in example #1 and example #2. In present disclosure, coating process Type 2, per example #2 which includes impregnation of Cu—Mn—Fe spinel, shows higher level of influence on catalytic activity and thermal stability than coating process Type 1, per example #1, which includes OC of ZPGM component using powder of Cu—Mn—Fe spinel. Fresh ZPGM catalyst samples, per example #1 and example #2, including Cu$_{0.5}$Mn$_{0.5}$Fe$_2$O$_4$ spinel on Nb$_2$O$_5$—ZrO$_2$ support oxide may exhibit suitable TWC performance when employed in ZPGM catalysts for a plurality of TWC applications, leading to a more effective utilization of ZPGM catalyst materials in TWC converters.

What is claimed is:

1. A process for making a catalytic system, comprising:
   providing a substrate;
   applying a washcoat to said substrate, wherein the substrate comprises alumina;
   applying an overcoat to said washcoat, said overcoat comprising at least one support oxide comprising doped ZrO$_2$;
   applying to said overcoat at least one layer of Cu—Mn spinel; and
   wherein the catalytic system is free of platinum group metals; and
   wherein the doped ZrO$_2$ comprises Nb$_2$O$_5$—ZrO$_2$.

2. The process of claim 1, wherein the Cu—Mn spinel has a general formula of Cu$_x$Mn$_{1-x}$Fe$_2$O$_4$, where x is less than 0.9 and greater than 0.1.

3. The process of claim 2, wherein x is 0.5.

4. The process of claim 3; wherein the catalytic system's conversion of NO$_x$ is greater than 49%.

5. The process of claim 1, wherein the Cu—Mn spinel is impregnated.

6. The process of claim 5; wherein the catalytic system's conversion of NO$_x$ is greater than 89%.

7. The process of claim 1, wherein the catalytic system's HC T$_{50}$ is less than or equal to 61° C.

8. The process of claim 1, wherein the catalytic system's NO$_x$T$_{50}$ is less than or equal to 55° C.

9. The process of claim 1, wherein the substrate comprises ceramics.

10. The process of claim 1, wherein the catalytic system's conversion of NO$_x$ increases with an increasing amount of Cu—Mn spinel.

11. The process of claim 1, wherein the catalytic system's NO/CO cross over increases with an increasing amount of Cu—Mn spinel.

12. The process of claim 1, wherein the catalytic system's catalytic performance under lean conditions increases with an increasing amount of Cu—Mn spinel.

13. The process of claim 1, wherein engine performance under lean conditions increases with an increasing amount of Cu—Mn spinel.

* * * * *